United States Patent
Nagurny et al.

(10) Patent No.: US 10,247,491 B2
(45) Date of Patent: Apr. 2, 2019

(54) PROCESS OF FRICTION STIR WELDING ON TUBE END JOINTS AND A PRODUCT PRODUCED THEREBY

(71) Applicant: Lockheed Martin Corporation, Bethesda, MD (US)

(72) Inventors: Nicholas J. Nagurny, Manassas, VA (US); Derek M. Beckner, Manassas Park, VA (US); Michael R. Eller, New Orleans, LA (US); Scott M. Maurer, Haymarket, VA (US); Trevor J. Owen, Vienna, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/493,237

(22) Filed: Apr. 21, 2017

(65) Prior Publication Data

US 2017/0219299 A1     Aug. 3, 2017

Related U.S. Application Data

(63) Continuation of application No. 14/202,636, filed on Mar. 10, 2014, now Pat. No. 9,658,002.

(Continued)

(51) Int. Cl.
*F28D 7/16*     (2006.01)
*F28F 9/14*     (2006.01)
(Continued)

(52) U.S. Cl.
CPC ............ *F28F 9/18* (2013.01); *B23K 20/129* (2013.01); *B23K 20/1265* (2013.01); *F28D 7/16* (2013.01);
(Continued)

(58) Field of Classification Search
CPC ............. B23K 20/1265; B23K 20/127; B23K 20/129; B23K 2201/14; F28F 9/14;
(Continued)

(56) References Cited

U.S. PATENT DOCUMENTS

| | | | | |
|---|---|---|---|---|
| 1,857,912 A | * | 5/1932 | Jones .................... | F22B 37/104 122/511 |
| 2,368,391 A | * | 1/1945 | Young .................... | F28F 9/185 165/134.1 |

(Continued)

FOREIGN PATENT DOCUMENTS

| | | |
|---|---|---|
| CN | 2470773 Y | 1/2002 |
| CN | 201244474 Y | 5/2009 |

(Continued)

OTHER PUBLICATIONS

Notice of Allowance and Examiner-Initiated Interview Summary for U.S. Appl. No. 14/202,636, dated Jan. 18, 2017, 12 pages.

(Continued)

*Primary Examiner* — Jason L Vaughan
(74) *Attorney, Agent, or Firm* — Withrow & Terranova, PLLC

(57) ABSTRACT

A process of producing shell and tube heat exchangers where the ends of the tubes are secured to a tube sheet while reacting applied FSW forces without introducing a crevice or local deformation near the ends of the tubes. In particular, an interference fit is used to lock the ends of the tubes into the tube sheet without flaring or expanding the tube ends. A FSW process is then used to weld the ends of the tubes to the tube sheet.

20 Claims, 10 Drawing Sheets

Related U.S. Application Data

(60) Provisional application No. 61/777,438, filed on Mar. 12, 2013.

(51) Int. Cl.
*F28F 9/18* (2006.01)
*B23K 20/12* (2006.01)
*B23K 101/14* (2006.01)

(52) U.S. Cl.
CPC ............... *F28F 9/14* (2013.01); *F28F 9/185* (2013.01); *B23K 2101/14* (2018.08); *F28F 2275/062* (2013.01); *Y10T 29/49364* (2015.01)

(58) Field of Classification Search
CPC .... F28F 9/18; F28F 9/182; F28F 9/185; F28F 2275/062
See application file for complete search history.

(56) References Cited

U.S. PATENT DOCUMENTS

| | | | | |
|---|---|---|---|---|
| 2,488,627 | A | * | 11/1949 | Hisey ............... B21D 53/085 165/151 |
| 3,349,465 | A | * | 10/1967 | La Pan ............... B21D 39/06 165/178 |
| 3,823,464 | A | * | 7/1974 | Chartet ............... B21D 39/06 228/136 |
| 4,171,014 | A | | 10/1979 | Straub |
| 4,334,703 | A | | 6/1982 | Arthur et al. |
| 4,505,420 | A | | 3/1985 | Wittenbach |
| 4,706,743 | A | * | 11/1987 | Chalimbaud ........... F28F 9/185 165/134.1 |
| 4,834,930 | A | | 5/1989 | Gemeinhardt |
| 5,088,193 | A | * | 2/1992 | Okada ............... B21D 53/02 29/890.043 |
| 5,101,887 | A | * | 4/1992 | Kado ............... F28F 9/182 165/173 |
| 5,150,520 | A | * | 9/1992 | Derisi ............... B21D 39/06 165/153 |
| 5,348,210 | A | * | 9/1994 | Linzell ............... B23K 20/129 228/115 |
| 5,366,006 | A | * | 11/1994 | Lu ............... F28F 9/182 165/173 |
| 5,400,951 | A | | 3/1995 | Shiroyama et al. |
| 5,419,042 | A | * | 5/1995 | Kado ............... B23P 11/00 29/515 |
| 5,519,182 | A | * | 5/1996 | Linzell ............... B23K 20/12 219/117.1 |
| 5,617,992 | A | | 4/1997 | Huddleston et al. |
| 6,318,094 | B1 | * | 11/2001 | Yundt, Jr. ............... F28F 19/06 165/133 |
| 6,592,287 | B1 | * | 7/2003 | Hagle ............... B23K 1/0008 228/258 |
| 6,631,740 | B1 | * | 10/2003 | Jackson ............... F16L 13/08 138/109 |
| 6,781,088 | B2 | * | 8/2004 | Grubb ............... B23K 26/28 219/121.64 |
| 7,011,149 | B2 | * | 3/2006 | Fujita ............... F28D 1/05391 165/153 |
| 7,252,138 | B2 | * | 8/2007 | Burkhalter ............ B23P 6/00 165/76 |
| 7,726,024 | B2 | * | 6/2010 | Ishii ............... B21D 53/085 165/178 |
| 7,726,025 | B2 | * | 6/2010 | Lee ............... F28F 9/187 165/173 |
| 7,791,000 | B2 | * | 9/2010 | Rahm ............... B23K 20/12 219/121.64 |
| 7,922,065 | B2 | | 4/2011 | Sutherlin et al. |
| 7,954,691 | B2 | | 6/2011 | Roos et al. |
| 8,230,594 | B1 | * | 7/2012 | Bossard ............... B23K 26/032 219/121.6 |
| 8,439,250 | B2 | * | 5/2013 | Takeshita ............. B23K 20/122 228/112.1 |
| 8,540,012 | B2 | | 9/2013 | Nagurny et al. |
| 8,578,714 | B2 | | 11/2013 | Nagurny et al. |
| 8,622,439 | B2 | | 1/2014 | His et al. |
| 9,039,814 | B2 | | 5/2015 | Bossard |
| 9,067,279 | B1 | | 6/2015 | Shuaib et al. |
| 9,174,301 | B2 | | 11/2015 | Eller et al. |
| 9,341,287 | B2 | | 5/2016 | Eller et al. |
| 9,658,002 | B2 | | 5/2017 | Nagurny et al. |
| 2006/0228194 | A1 | | 10/2006 | Nilsen et al. |
| 2009/0159643 | A1 | | 6/2009 | Wimmer et al. |
| 2009/0308582 | A1 | | 12/2009 | Nagurny et al. |
| 2010/0139077 | A1 | * | 6/2010 | Linzell ............... B23K 20/12 29/525 |
| 2010/0162967 | A1 | | 7/2010 | Taylor |
| 2010/0181054 | A1 | | 7/2010 | Nagurny et al. |
| 2010/0314075 | A1 | * | 12/2010 | Takahashi ........... B23K 20/122 165/104.19 |
| 2011/0000952 | A1 | | 1/2011 | Takeshita et al. |
| 2011/0011570 | A1 | | 1/2011 | Levings et al. |
| 2011/0139424 | A1 | * | 6/2011 | Bensel ............... F28F 9/04 165/173 |
| 2012/0199330 | A1 | | 8/2012 | Maurer et al. |
| 2012/0199331 | A1 | | 8/2012 | Maurer et al. |
| 2012/0199334 | A1 | | 8/2012 | Maurer et al. |
| 2012/0199335 | A1 | | 8/2012 | Maurer |
| 2013/0037601 | A1 | * | 2/2013 | Eller ............... B23K 37/0536 228/112.1 |
| 2014/0261900 | A1 | | 9/2014 | Maurer et al. |
| 2014/0262173 | A1 | | 9/2014 | Nagurny et al. |

FOREIGN PATENT DOCUMENTS

| | | |
|---|---|---|
| CN | 101559530 A | 10/2009 |
| DE | 69104835 T2 | 5/1995 |
| DE | 69313131 T2 | 3/1998 |
| EP | 2072938 A2 | 6/2009 |
| JP | S5983204 U | 6/1984 |
| JP | S59181997 | 12/1984 |
| JP | S64034724 A | 2/1989 |
| JP | 2001271812 A | 10/2001 |
| JP | 2002048115 A | 2/2002 |
| JP | 2009148831 A | 7/2009 |
| JP | 2012187623 A | 10/2012 |
| WO | 2013023083 A2 | 2/2013 |

OTHER PUBLICATIONS

First Office Action and Search Report for Chinese Patent Application No. 201480014691.9, dated Feb. 21, 2017, 23 pages.
First Substantive Examination for Swedish Patent Application No. 1551304-7, dated Jul. 29, 2016, 5 pages.
International Search Report and Written Opinion for International Patent Application No. PCT/US2014/022615, dated Jul. 8, 2014, 10 pages.
International Preliminary Report on Patentability for International Patent Application No. PCT/US2014/022615, dated Sep. 24, 2015, 8 pages.
First Office Action for German Patent Application No. 11 2014 001 333.1, dated Nov. 22, 2017, 12 pages.
Notice of Reasons for Rejection for Japanese Patent Application No. 2016-501015, dated Feb. 27, 2018, 7 pages.
Non-Final Office Action for U.S. Appl. No. 15/493,245, dated Jan. 18, 2019, 9 pages.

* cited by examiner

PROCESS OF FRICTION STIR WELDING ON TUBE END JOINTS AND A PRODUCT PRODUCED THEREBY

RELATED APPLICATIONS

This application is a continuation of co-pending U.S. patent application Ser. No. 14/202,636, filed on Mar. 10, 2014, entitled "PROCESS OF FRICTION STIR WELDING ON TUBE END JOINTS AND A PRODUCT PRODUCED THEREBY," which claims the benefit of U.S. Provisional Application No. 61/777,438, filed on Mar. 12, 2013, entitled "PROCESS OF FRICTION STIR WELDING ON TUBE END JOINTS AND A PRODUCT PRODUCED THEREBY," the disclosures of which are hereby incorporated herein by reference in their entireties.

TECHNICAL FIELD

This disclosure relates to friction stir welding on heat exchangers, such as shell and tube heat exchangers.

BACKGROUND

Shell and tube friction stir welded (FSW) heat exchangers have been developed for marine grade applications such as ocean thermal energy conversion, thermal desalination and other relatively low temperature processes. In addition, the FSW process is being used in other heat exchangers that operate under higher temperatures and 15 pressures. In the FSW process as applied to shell and tube heat exchangers, a solid state welding or stirring process is used wherein the ends of tube walls are "stirred" into surrounding tube sheet material without introducing dissimilar metals and without adverse effect to metal grain structure.

In the heat exchanger, the tubes are inserted into tube sheets on either end of the 20 bundle of tubes in a manner similar to traditional shell and tube heat exchanger designs. The ends of the tubes are normally flared prior to the FSW process. This flaring or tubeend expansion allows the tubes to stay in place while reacting the forces applied during the FSW process.

The FSW process eliminates crevices that would ordinarily exist between 25 mechanically rolled tube ends and the surrounding tube sheet material. Elimination of crevices is desirable to obtain a heat exchanger that can have long-life in a corrosive seawater environment. However, the process of flaring or expanding the ends of the tubes can sometimes introduce an undesirable crevice or locally deformed zone that can become a site for preferential crevice corrosion, particularly in a seawater environment.

SUMMARY

This description describes an approach to producing shell and tube heat exchangers, where the ends of the tubes are secured to a tube sheet while reacting applied FSW forces without introducing a crevice or local deformation near the ends of the tubes. In particular, an interference fit is used to lock the ends of the tubes into the tube sheet without flaring or expanding the tube ends. A FSW process is then used to weld the ends of the tubes to the tube sheet.

The tubes and the tube sheets can be made of any metals commonly used in shell and tube heat exchanger assemblies including, but not limited to, aluminum, carbon steel, stainless steel, titanium, copper or other metals and alloys thereof.

The interference fit can be achieved in any suitable manner that avoids flaring or expanding the tube ends. In one embodiment, local deformation of the tube end surfaces or tube sheet surfaces and galling between adjacent surfaces can provide sufficient retention to keep the installed tube ends from being dislodged under a large axially applied load that occurs during the FSW process.

One example of a local deformation is a knurled exterior tube surface at the tube ends. Other examples of achieving an interference fit include, but are not limited to, the use of tubing with external features such as corrugations and low-fin designs, or tubes with exterior raised features that become deformed during installation to effectively locking the tube ends in place in an interference fit.

In one embodiment, a process of connecting a tube to a tube sheet includes inserting an end of the tube into a hole in the tube sheet with an interference fit between the tube end and the tube sheet that locks the tube end into the tube sheet without flaring or expanding the end of the tube adjacent to the tube sheet. The tube end is then FSW to the tube sheet.

In another embodiment, a heat exchanger includes a first tube sheet having a plurality of holes, an inner side and an outer side. A plurality of tubes have first ends disposed in a corresponding one of the holes in the first tube sheet, with an interference fit between each first end and the first tube sheet, and the first end of each tube is not flared or expanded. The first end of each tube is FSW to the first tube sheet at the outer side of the first tube sheet.

DETAILED DESCRIPTION

This description describes an approach to producing shell and tube heat exchangers, where prior to FSW of the tubes to the tube sheet, an interference fit is used to lock the ends of the tubes into the tube sheet without flaring or expanding the tube ends. A FSW process is then used to weld the ends of the tubes to the tube sheet.

The resulting shell and tube heat exchanger can be used in any heat exchange application, whether on land or on or in water. However, the described shell and tube heat exchanger has particular benefits in a salt water environment as the shell and tube heat exchanger eliminates crevices or local deformations near the ends of the tubes that can form sites for preferential crevice corrosion.

To help explain the inventive concepts, a specific application of the shell and tube heat exchanger in an OTEC system will be described. However, it is to be realized that the shell and tube heat exchanger is not limited to use in an OTEC system, but instead can be used in any heat exchange application.

In addition, the inventive concepts are not limited to use in a shell and tube heat exchanger, but instead can be used in any heat exchanger application where it is desirable to connect a tube to a supporting structure using FSW, including but not limited to, in a manner that eliminates crevices or local deformations near the ends of the tubes that can form sites for preferential crevice corrosion. Therefore, the term tube sheet as used herein and in the claims is intended to broadly encompass any supporting structure to which a tube is to be secured, unless otherwise indicated.

Figure 1:
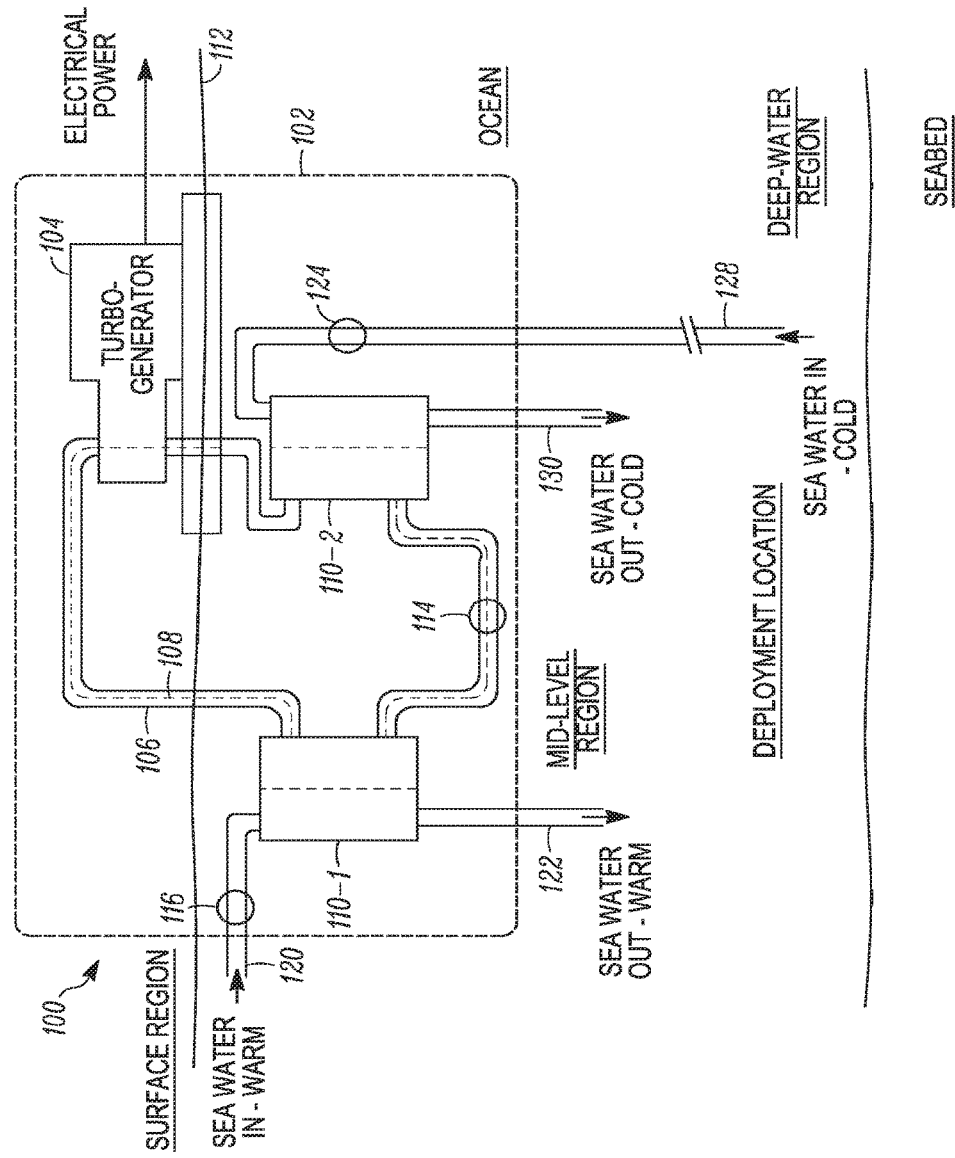
FIG. 1 is a schematic diagram of the layout of a conventional OTEC power generation system in which the described heat exchanger can be utilized in one embodiment.

FIG. 1 is a schematic diagram of the layout of a conventional OTEC power generation system 100. The overall construction and operation of an OTEC system is well known to those of ordinary skill in the art. The OTEC system 100 can be deployed in any suitable body of water such as an ocean, sea, a salt or fresh water lake, etc.

In this embodiment, the system 100 includes an offshore platform 102, a turbogenerator 104, a closed-loop conduit 106, an evaporator 110-1, a condenser 110-2, a hull 112, a plurality of pumps 114, 116, and 124, and fluid conduits 120, 122, 128, and 130. The closed-loop conduit 106 is a conduit for conveying working fluid 108 through the evaporator 110-1, the condenser 110-2, and the turbogenerator 104.

The evaporator 110-1 can be a shell-and-tube heat exchanger that is configured to transfer heat from warm seawater at surface region and working fluid 108 thereby inducing the working fluid to vaporize.

The condenser 110-2 can also be a shell-and-tube heat exchanger that is configured to transfer heat from vaporized working fluid 108 to cold seawater from the deep-water region thereby inducing condensation of vaporized working fluid 108 back into liquid form.

Figure 2:
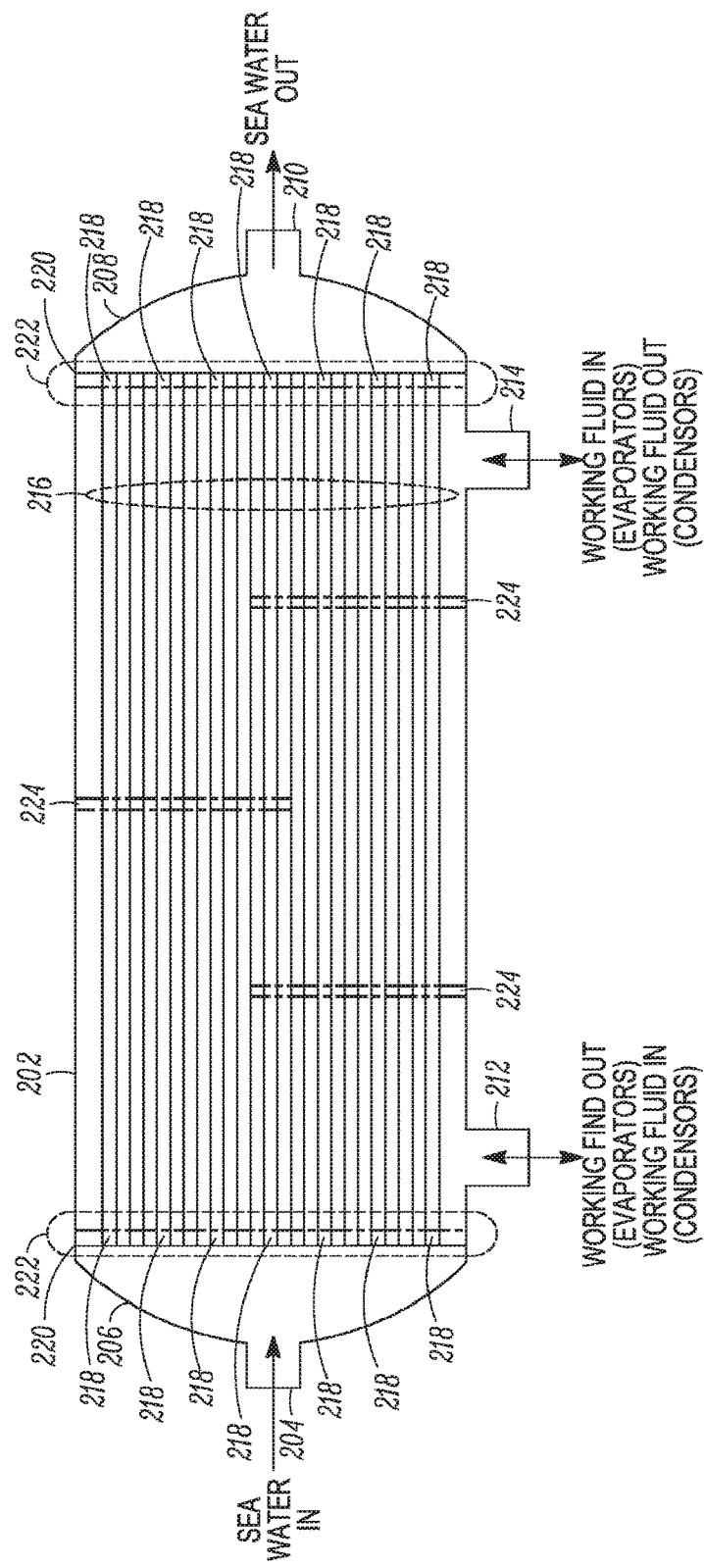
FIG. 2 is a cross-sectional view of a shell and tube heat exchanger according to one embodiment described herein.

FIG. 2 illustrates a shell and tube heat exchanger 110 that can be used for the evaporator 110-1 and/or the condenser 110-2. In this example, the heat exchanger 110 includes a shell 202, a first fluid inlet 204, an input manifold 206, an output manifold 208, a first fluid outlet 210, a secondary fluid port 212, a secondary fluid port 214, tubes 216 that form a tube bundle, first and second tube sheets 220 and baffles 224. As would be understood by a person of ordinary skill in the art, the heat exchanger 110 provides heat exchange between a first fluid that flows through the tubes 216 and a secondary fluid that flows through the shell 202 across the outer surface of each of the tubes 216. In one embodiment, the first fluid inlet 204 and the first fluid outlet are for seawater that flows through the tubes 216. In the case of evaporators, the fluid port 212 can be an outlet port for working fluid while the fluid port 214 can be an inlet port for the working fluid. In the case of condensers, the fluid port 212 can be an inlet port for working fluid while the fluid port 214 can be an outlet port for the working fluid.

Further information of the construction of the heat exchanger 110 is disclosed in U.S. Pat. No. 8,439,250, which is incorporated herein by reference in its entirety.

Figure 3B:
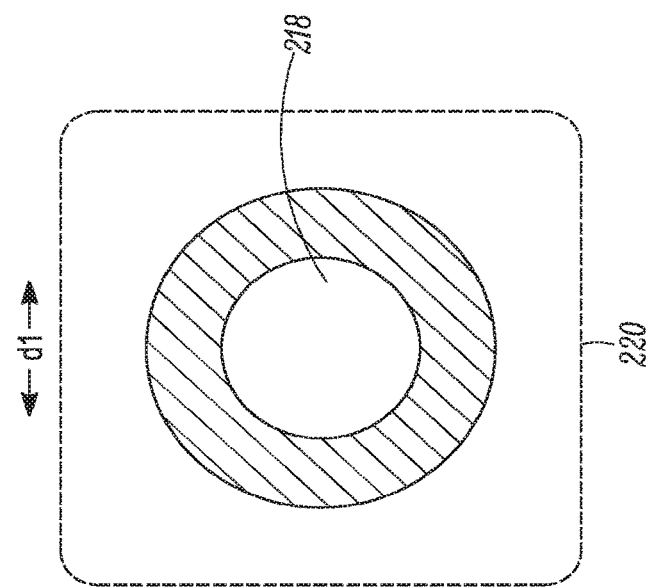
FIG. 3B is close-up view of the region A-A in FIG. 3A.
Figure 3A:
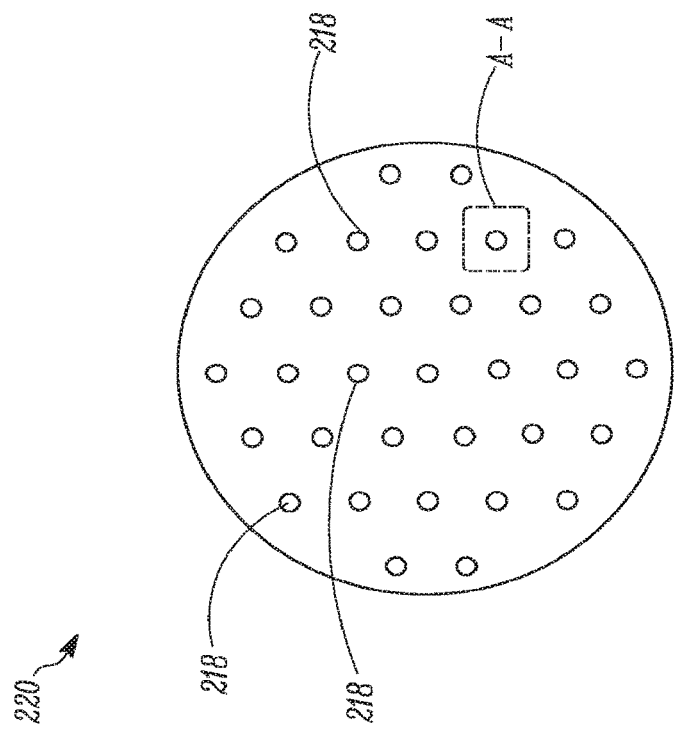
FIG. 3A is an end view of one of the tube sheets of the heat exchanger in FIG. 2.

With reference to FIGS. 3A and 3B, each of the tube sheets 220 is a mechanically rigid plate that includes a plurality of holes 218 that extend through the tube sheet 220 from an inner side surface 222 (FIG. 7) that faces the interior chamber of the heat exchanger 110 to an outer side surface 223 (FIG. 7) that faces the respective manifold 206, 208. Each hole 218 is illustrated as being circular with a diameter D1. Likewise, the tube sheets 220 are illustrated as being circular but can have any shape suitable for use in a heat exchanger.

Figure 4:
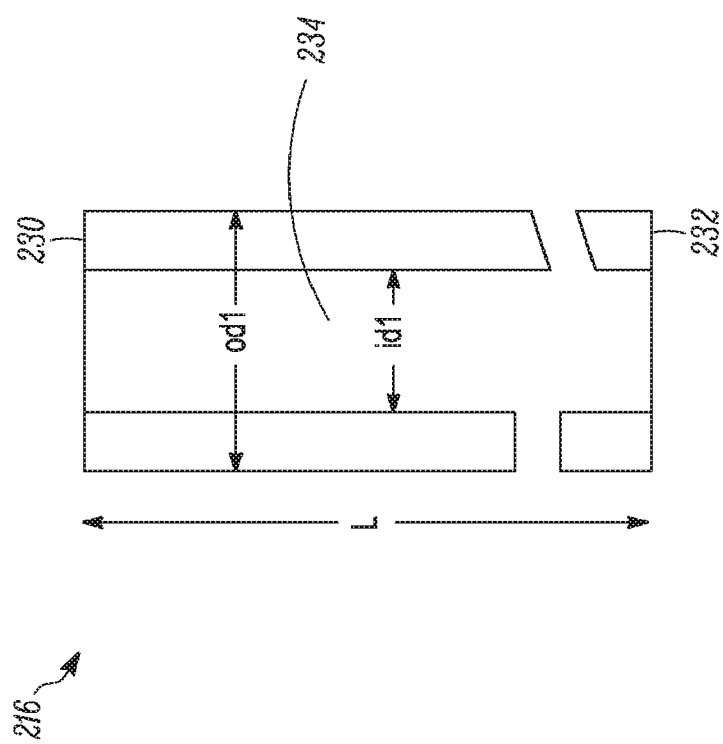
FIG. 4 illustrates one of the tubes according to one exemplary embodiment.

FIG. 4 illustrates an example of one of the tubes 216. Each tube 216 includes a first end 230 and a second end 232, a central fluid passageway 234, and a length L between the first end and the second end. In the illustrated example, the tubes 216 are shown as being cylindrical in shape with an inner diameter ID1 and an outer diameter OD1. However, the tubes 216 and the holes 218 in the tube sheets 220 can have any complementary shapes, such as rectangular or triangular.

The tubes 216 and the tube sheets 220 can be made of any metals commonly used in shell and tube heat exchanger assemblies including, but not limited to, aluminum, carbon steel, stainless steel, titanium, copper or other metals and alloys thereof.

The ends 230, 232 of the tubes 216 are joined to the tube sheets 220 at the holes 218 using a FSW process. FSW is a well-known method for joining two elements of the same or dissimilar material. FSW employs a rotating probe that is forced into the interface between the two elements. The immense friction between the probe and materials causes material in the immediate vicinity of the probe to heat up to temperatures below its melting point. This softens the adjoining sections, but because the material remains in a solid state, its original material properties are retained. Movement of the probe along the weld line forces the softened material from the two pieces towards the trailing edge causing the adjacent regions to fuse, thereby forming a weld.

As discussed above, an interference fit is used to lock the ends 230, 232 of the tubes 216 into the holes of the tube sheets 220 without flaring or expanding the tube ends. The FSW process is then used to weld the ends of the tubes to the tube sheet.

Numerous possibilities exist for creating a suitable friction fit, and any technique that creates a friction fit without flaring or expanding the tube ends can be used. The exterior surface of the tube can be modified, the interior surface of the holes 218 can be modified, or a combination of modifying the tube exterior surface and the hole interior surface can be used.

Figure 5:
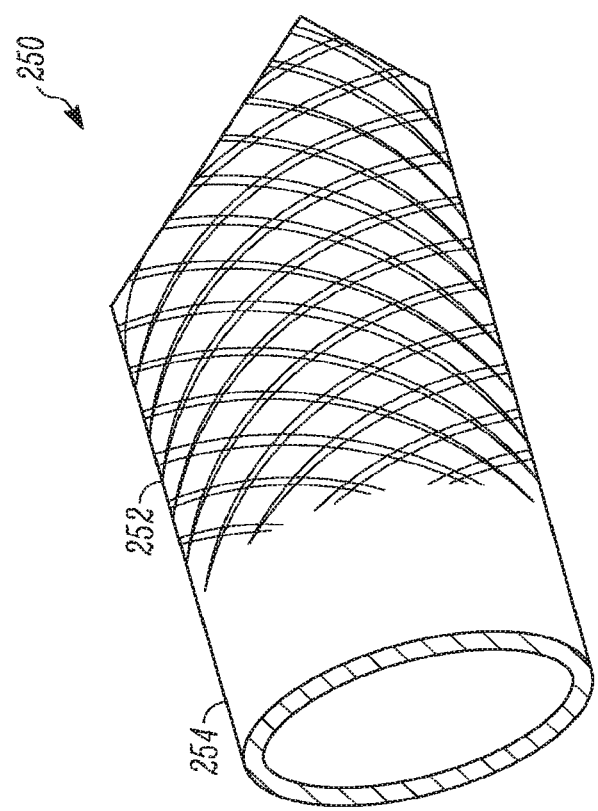
FIG. 5 illustrates the end of a tube showing one exemplary embodiment for creating an interference fit.

FIG. 5 illustrates an end of a tube 250 that can be used, where the exterior surface of the tube 250 adjacent to each end is knurled 252 as well as having a non-knurled, smooth portion 254 between the knurled portion and the terminal end of the tube. A suitable tube with a knurled external surface is available from Energy Transfer, Inc. of Minerva, Ohio.

In this example of FIG. 5, the outer diameter OD1 of the tube 250 with the knurled exterior is substantially equal to or only slightly less than the diameter D1 of the holes 218, such that the end of the tube 250 can be inserted into the hole 218 with an interference fit therebetween. The interference fit should be sufficient to react against the loads that are applied during the FSW process, thereby locking the end of the tube in place and prevent axial and rotational movement of the tube during the FSW process.

In addition, in the example of FIG. 5, the inner diameter ID1 of the tube 250 both before and after FSW is constant from one end to the other. The outer diameter OD1 is also substantially constant between the ends of the tube both before and after FSW.

In one embodiment, when the tube end is inserted into the hole 218, some of the smooth portion 254 is located in the hole along with some of the knurled portion 252.

Figure 6:
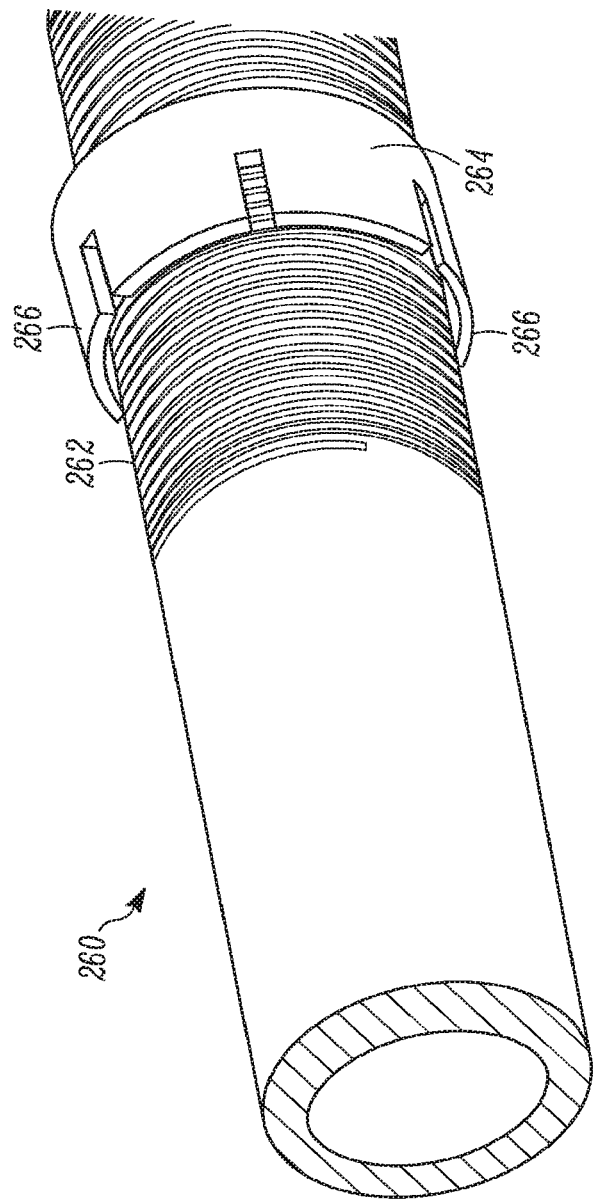
FIG. 6 illustrates the end of a tube showing another exemplary embodiment for creating an interference fit.
Figure 7:
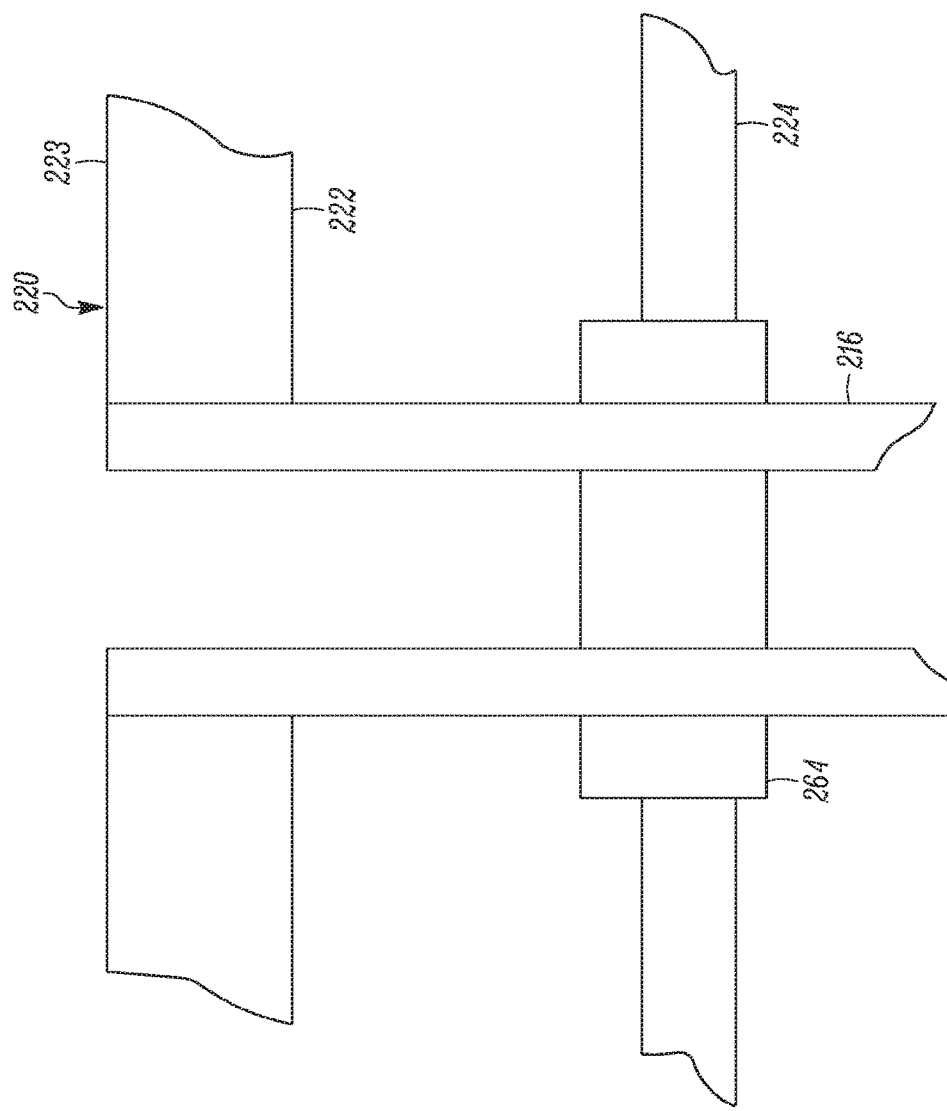
FIG. 7 is a cross-sectional view showing details of the joint between one of the tubes and the tube sheet prior to FSW.

FIG. 6 illustrates another embodiment of a tube 260 that includes fins or corrugations 262 (that are similar to threads) on the exterior surface for creating the interference fit. A suitable tube with this construction is available from Energy Transfer, Inc. of Minerva, Ohio. An optional press-fit collar 264 having deflectable tabs 266 separated by gaps can also be disposed around the fins 262 to enhance the interference fit. The tabs 266 deflect inwardly to lock onto the fins 262. Alternatively, the collar 264 can be disposed within the hole 218 of the tube sheet 220 with the tube sliding into the hole in one direction but cannot be pulled out because the tabs engage with the fins. In another alternative embodiment, as shown in FIG. 7, the collar 264 can fit in a hole in the baffle 224 or otherwise engage with the baffle 224 for load support.

Figure 8:
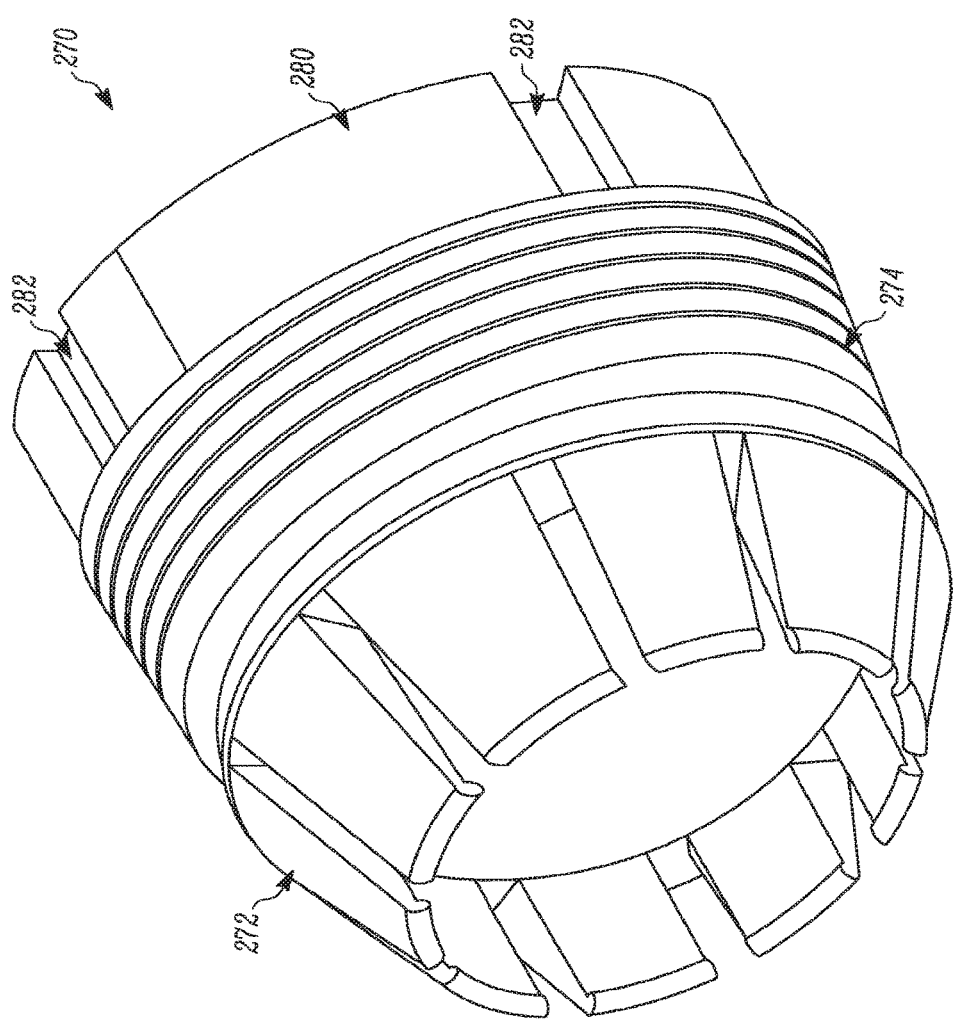
FIG. 8 illustrates another exemplary embodiment for creating an interference fit.

FIG. 8 illustrates an example of a press-fit collar 270 that can be disposed around a tube. The collar 270 can have deflectable tabs 272 that are similar to the tabs 266 in FIG. 6. The tabs 272 are designed to deflect radially inwardly to create an interference fit with the enhanced (for example, the knurls 252 in FIG. 5, the fins 262 in FIG. 6, or the like) outer surface of the tube. The collar 270 can also have external threads 274 on a portion of the collar without the deflectable tabs 272. The external threads 274 are intended to thread into corresponding threads 276 (see FIG. 10) formed in a receiving hole 278 in the side surface 222 of the tube sheet 220 or on either side of a hole formed in the baffle 224.

Figure 10:
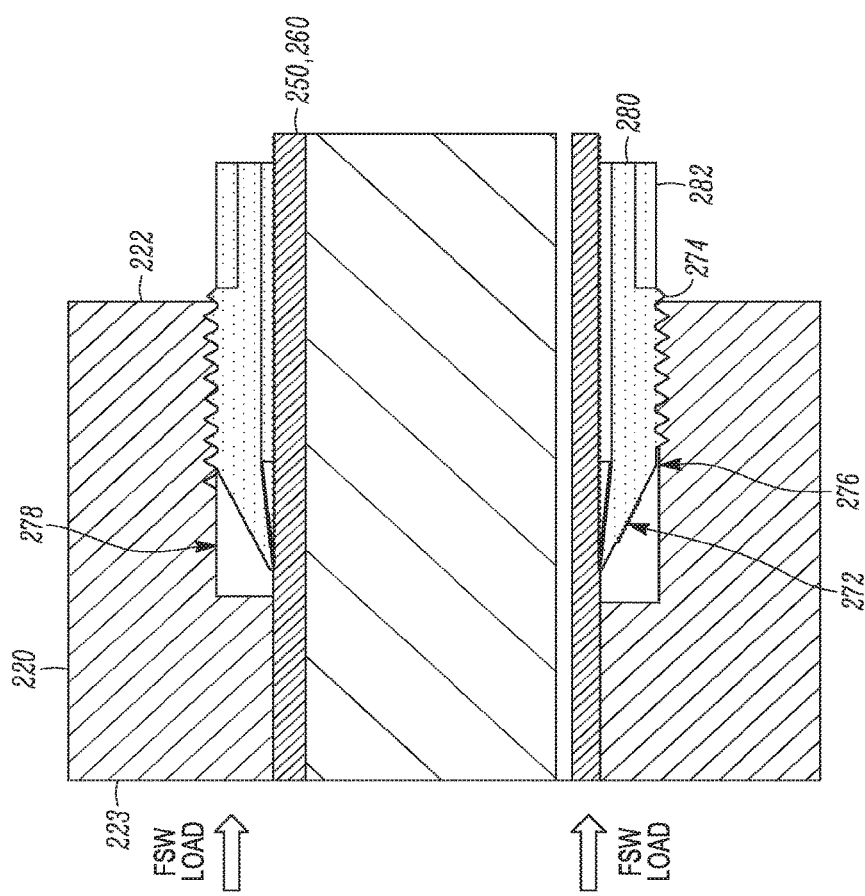
FIG. 10 is a cross-sectional view through one of the holes in a tube sheet illustrating the embodiment of FIG. 8 installed in the hole of the tube sheet.

As is evident from FIG. 10, the receiving hole 278 has a larger diameter than the remainder of the hole 218 that the tube 250, 260 forms a friction fit with. The interior surface of the hole 278 is formed with the threads 276 that engage with the threads 274 on the exterior of the collar 270.

Figure 9A:
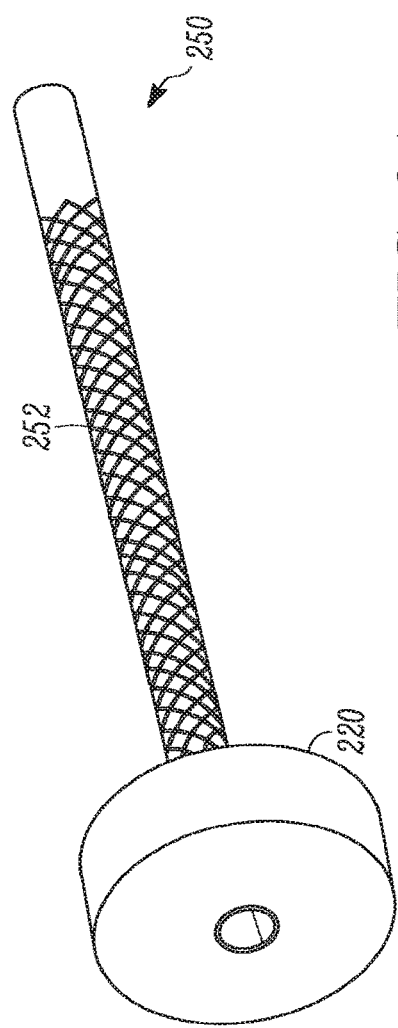
FIGS. 9A and 9B illustrate the embodiment of FIG. 8 used with the tubes shown in FIGS. 5 and 6 respectively.
Figure 9B:
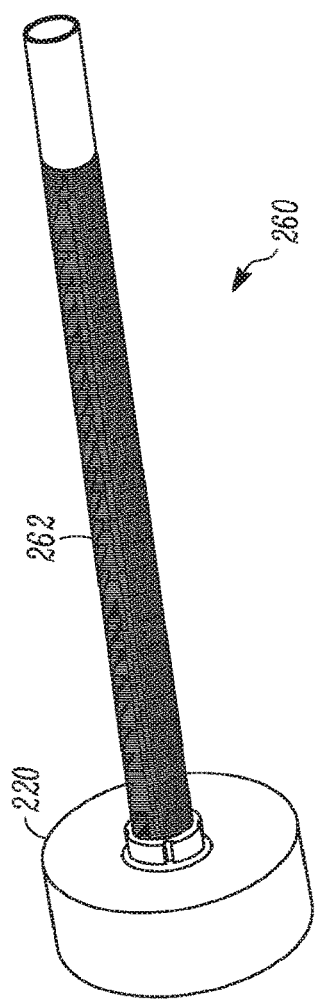

FIG. 9A depicts an example of the tube 250 and collar 270 assembly secured within a hole in the tube sheet 220 (the tube sheet 220 is only partially shown with one hole). FIG. 9B depicts an example of the tube 260 and collar 270 assembly secured within a hole in the tube sheet 220 (the tube sheet 220 is only partially shown with one hole). In one embodiment, the collar 270 is initially press fit onto either the knurled tube 250 or the tube 270 with the fins. The tube and collar assembly are then threaded into the threaded hole 278 of the tube sheet or the baffle.

To assist in threading the collar 270 into the receiving hole 278 of the tube sheet 220, the collar 270 can also have an extended cylindrical feature 280 projecting from the threaded portion that has cutouts 282, flat faces or other wrench or tool engagement structure so that a spanner wrench or other tool can be used to rotate the collar 270 to tighten the collar 270 and tube assembly into the threaded hole 278 and/or unthread the collar from the hole.

The threading features on the collar 270 and on the receiving hole 278 allows assembly personnel to precisely screw/fasten the collar-and-tube assembly into the tube sheet 220 such that the tube end is flush with the outer surface 223 of the tube sheet. This precision threading feature solves the issue of manufacturing tolerances that cause fit-up variances using other press-fit methods Another example of creating an interference fit could be a lock and key-type where, similar to FIG. 6, a swaged type of key could be pressed onto the tube that could have grooves to engage the bottom side of the tube sheet 220 or tube baffle 224. In another embodiment, instead of a key, a tapered fin or wedge could be integrally formed on the tube that locks against the inner surface of the tube sheet hole to provide the interference fit.

In another embodiment, the back side of the tube sheet 220 could be tapped with a thread pattern that matches the external fins or threads 262 on the tube 260 in FIG. 6. The tube 260 could then be threaded into the backside of the tube sheet 220 providing the necessary resistance for the friction stir weld.

Once the tube ends are inserted into the holes of the tube sheet. FSW can then be used to weld the tube ends to the tube sheet.

For the second ends of the tubes and the second tube sheet, the second ends may be fixed to the second tube sheet using a conventional FSW process like that described in U.S. Pat. No. 8,439,250 where the second ends of the tubes are immobilized relative to the second tube sheet by expanding the second ends of the tubes, followed by FSW to weld the second ends of the tubes to the tube sheet.

Example Process

The following describes a sample process used to secure aluminum tubes to an aluminum tube sheet. This exemplary process is applicable for only one side (i.e. one of the tube sheets) of the heat exchanger and not for both tube sheets, since the second tube sheet cannot be accessed in the same manner as the first tube sheet.

In this example, the tubes were 1 inch NPS schedule 40 coarse-knurled tubes with 3 inches of smooth tube on the end (similar to the embodiment of FIG. 5), 12 inches in length. The tube sheet was a 2 inch thick aluminum tube sheet with holes for 7 tubes. In this exemplary process, a backing anvil/force to support the tubes is not used; only the tube sheet is supported.

1. The tube sheet was supported over the FSW anvil by placing aluminum blocks under opposing sides of the tube sheet, without blocking the tube holes. The height of the blocks determined how much of the tube can pass through the tube sheet hole before it is stopped at the anvil.

2. The exterior of the tubes and the interior of the tube sheet holes were cleaned with isopropyl alcohol, acetone, or other cleaner.

3. The tubes were then inserted into the tube sheet holes. The opposite tube ends were then struck using a rubber mallet to drive the tubes through the tube sheet until the tubes touch the anvil below the tube sheet. Approximately 0.5 inch of the smooth tube section 254 remained in the tube sheet hole for proper welding, with the remainder of the tube within the hole being the knurled section 252.

4. By now, the tubes should be near-galled and should not move in the tube sheet. On the weld side (i.e. the outer side of the tube sheet), the tubes were cut so that the tube ends are flush with the outer surface of the tube sheet.

5. The weld surface and the interior of the tubes were then cleaned.

6. The tubes are then deburred and the tubes and the tube sheet are then FSW. There should be no axial movement or spinning observed in the tubes as the weld proceeds.

FIG. 7 illustrates an example of the tube 216 inserted into one of the holes of the tube sheet 220, with the tube cut so as to be flush with the outer surface 223 and ready for FSW. As seen in FIG. 7, there is no flaring or expanding of the tube end prior to FSW. Instead, the inner diameter and outer diameter of the tube remain constant. Therefore, the described method does not introduce any crevice or other local deformation near the tube end that could act as a preferential site for corrosion.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A process of connecting a tube to a tube sheet, comprising:
    inserting a tube end of the tube into a tube sheet hole of the tube sheet with an interference fit between the tube end and the tube sheet that locks the tube end into the tube sheet without flaring or expanding any cross-sectional dimension of the tube end adjacent to the tube sheet; and
    friction stir welding the tube to the tube sheet.

2. The process of claim 1, wherein the interference fit is created by modifying an exterior surface of the tube, modifying an interior surface of the tube sheet hole, or both modifying the exterior surface of the tube and modifying the interior surface of the tube sheet hole.

3. The process of claim 2, wherein the interference fit is created by modifying the exterior surface of the tube to include knurls or fins.

4. The process of claim 2, wherein the interference fit is created by modifying the exterior surface of the tube to include a plurality of corrugations.

5. The process of claim 2, wherein the interference fit is created by modifying the exterior surface of the tube to include a thread.

6. The process of claim 1, wherein the interference fit is created by a tapered fin formed on the tube end.

7. The process of claim 1, further comprising installing a collar around the tube, and at least partially fitting the collar into the tube sheet hole or into a hole in a baffle that is separate from the tube sheet.

8. The process of claim 7, wherein the collar includes a plurality of deflectable tabs that can deflect radially inward to engage with an exterior surface of the tube.

9. The process of claim 8, wherein the collar further includes external threads, the tube sheet hole or the hole in the baffle includes interior threads on an interior surface of the hole in the baffle, the process further comprising threading the collar into the tube sheet hole or into the hole in the baffle so that the external threads on the collar are engaged with the interior threads.

10. The process of claim 9, wherein the collar further includes a tool engagement structure that facilitates rotation of the collar relative to the tube sheet hole or the hole in the baffle to thread the collar into or out of the tube sheet hole or the hole in the baffle, and threading the collar into the tube sheet hole or into the hole in the baffle using a tool engaged with the tool engagement structure.

11. The process of claim 10, further comprising threading the collar into the tube sheet hole or the hole in the baffle until the tube end is flush with one face of the tube sheet.

12. The process of claim 1, wherein the tube and the tube sheet form part of a heat exchanger.

13. The process of claim 1, wherein the tube end and the tube sheet hole are circular.

14. A process of connecting a tube to a tube sheet, comprising:
    inserting a tube end of the tube into a tube sheet hole of the tube sheet with an interference fit between the tube end and the tube sheet that locks the tube end into the tube sheet without flaring or expanding the tube end adjacent to the tube sheet; and
    friction stir welding the tube to the tube sheet;
    wherein the interference fit is created by modifying an exterior surface of the tube, modifying an interior surface of the tube sheet hole, or both modifying the exterior surface of the tube and modifying the interior surface of the tube sheet hole;
    wherein the exterior surface of the tube has a modified exterior surface portion that creates the interference fit with the tube sheet hole, and has a smooth exterior surface portion between the modified exterior surface portion and the tube end, and wherein:
        inserting the tube end of the tube into the tube sheet hole of the tube sheet with the interference fit between the tube end and the tube sheet that locks the tube end into the tube sheet without flaring or expanding any cross-sectional dimension of the tube end adjacent to the tube sheet further comprises:
        inserting the tube end of the tube into the tube sheet hole of the tube sheet with the interference fit between the tube end and the tube sheet that locks the tube end into the tube sheet without flaring or expanding any cross-sectional dimension of the tube end adjacent to the tube sheet such that a portion of the modified exterior surface portion is within the tube sheet hole and a portion of the smooth exterior surface portion is within the tube sheet hole.

15. The process of claim 14, wherein the interference fit is created by modifying the exterior surface of the tube to include knurls or fins.

16. The process of claim 14, wherein the interference fit is created by modifying the exterior surface of the tube to include a plurality of corrugations.

17. The process of claim 14, wherein the interference fit is created by modifying the exterior surface of the tube to include a thread.

18. The process of claim 14, wherein the interference fit is created by a tapered fin formed on the tube end.

19. The process of claim 14, further comprising installing a collar around the tube, and at least partially fitting the collar into the tube sheet hole or into a hole in a baffle that is separate from the tube sheet.

20. The process of claim 14, wherein the tube and the tube sheet form part of a heat exchanger.

* * * * *